United States Patent [19]

Kokubu

[11] Patent Number: 5,099,091
[45] Date of Patent: Mar. 24, 1992

[54] THREE POSITION MULTIPLE SWITCH ASSEMBLY WITH INTERLOCK

[75] Inventor: Sadao Kokubu, Aichi, Japan

[73] Assignee: Kabushiki Kaisha Tokai-Rika-Denki-Seisakusho, Ohguchi, Japan

[21] Appl. No.: 507,485

[22] Filed: Apr. 11, 1990

[30] Foreign Application Priority Data

Apr. 19, 1989 [JP] Japan ................. 1-46038[U]

[51] Int. Cl.$^5$ ................. H01H 9/26; H01H 21/40
[52] U.S. Cl. ................. 200/5 B; 200/50 C; 200/315
[58] Field of Search ......... 200/5 B, 5 C, 5 D, 5 E, 200/6 R, 6 B, 6 BA, 6 BB, 6 C, 50 C, 315, 339

[56] References Cited

U.S. PATENT DOCUMENTS 3,560,677 2/1971 Kolb et al. ................. 200/50 C
4,242,551 12/1980 Sorenson ................. 200/315 X Primary Examiner—J. R. Scott
Attorney, Agent, or Firm—Sixbey, Friedman, Leedom & Ferguson

[57] ABSTRACT

A switch device suitable for application in a window regulator of an automobile. The switch device is capable of detecting three distinct operations of a knob, and is comprised of: a first operation to one side from a neutral position; a second operation to the opposite side; and a third operation to the first side larger than the first operation. Two switches are provided in correspondence to the respective first and second operations and these switches are provided with contacts which are switched by these three operations. When the third operation is effected, an interlock member transmits this third operation to the second switch, whereby the contacts of both the first and second switches are caused to be switched simultaneously.

25 Claims, 13 Drawing Sheets

FIG.13

| MODE \ INPUT OR OUTPUT | Ia | Ib | Oa | Ob |
|---|---|---|---|---|
| STOP | L | L | L | L |
| LOWER | H | L | H | L |
| LIFT | L | H | L | H |
| AUTOMATIC LOWER AND LIFT | H | H | H (CONTINUOUSLY) | L | ns.
THREE POSITION MULTIPLE SWITCH ASSEMBLY WITH INTERLOCK

BACKGROUND OF THE INVENTION

1. Field of the Invention

The present invention relates to a switch device capable of detecting three distinct operational actions and being selectively activated to perform 4 distinct operations.

2. Background Information

Some switch devices used for raising and lowering a door window glass of an automobile comprise, in addition to a raising switch and a lowering switch, a third switch used to enable a passenger to completely close or open the window glass simply by just a single brief operation.

In these devices, at least three switches are needed to achieve two distinct modes of operation: first, to raise or lower a door window glass just while a passenger manipulates and holds a knob in position, and alternatively to move the window glass to its final destination (either completely closed or completely open) by virtue of the passenger simply manipulating a knob in one brief stroke.

SUMMARY OF THE INVENTION

Taking the above fact into consideration, it is an object of the present invention to provide a switch device capable of achieving three different operating states by using only two switches.

According to the present invention, two switches are provided, each of which may be separately activated by the swinging operation of a knob a specified distance in one of two opposite directions from a neutral position. Alternatively, the knob may be swung an additional distance in one of the two directions causing the contact of the switch activated by the shorter swinging of the knob in the same direction to be held in a turned on state, and further, causing an interlock lever to transmit the large swinging operation to the other switch as well, causing this switch also to be turned on. This simultaneous actuation of both switches is enabled by the detection of the large swinging operation. The two switches stay on until the window glass moving operation is completed.

BRIEF DESCRIPTION OF THE DRAWINGS

FIG. 13 is a diagram showing the relationship between an input signal and an output signal of a detection control circuit;

DESCRIPTION OF THE PREFERRED EMBODIMENT

The present invention will be described below with respect to an embodiment applied to a window regulator of an automobile with reference to drawings.

Figure 1:
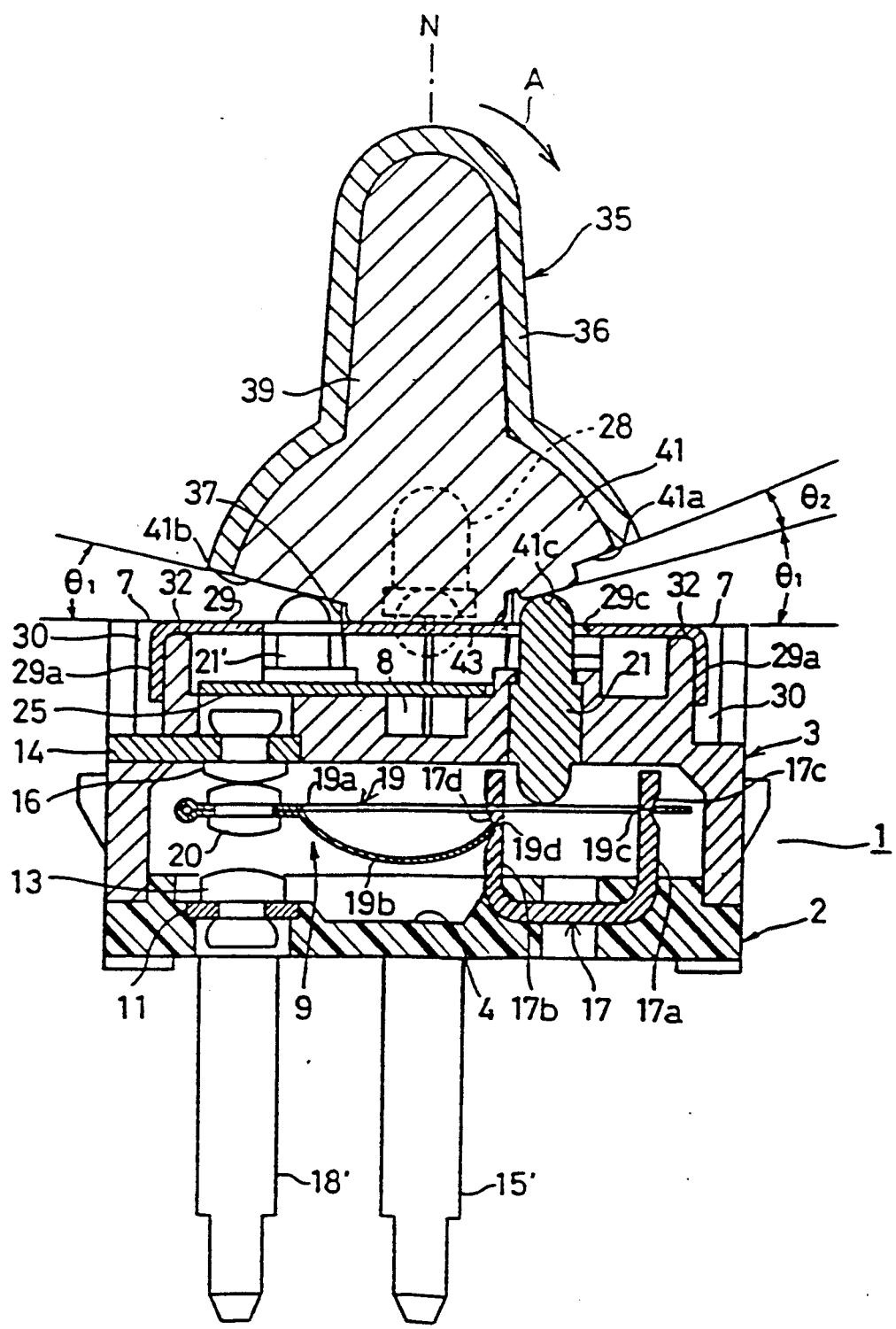
FIG. 1 is a cross-sectional view showing a switch device according to an embodiment of the present invention taken along the line I—I of FIG. 2.
Figure 2:
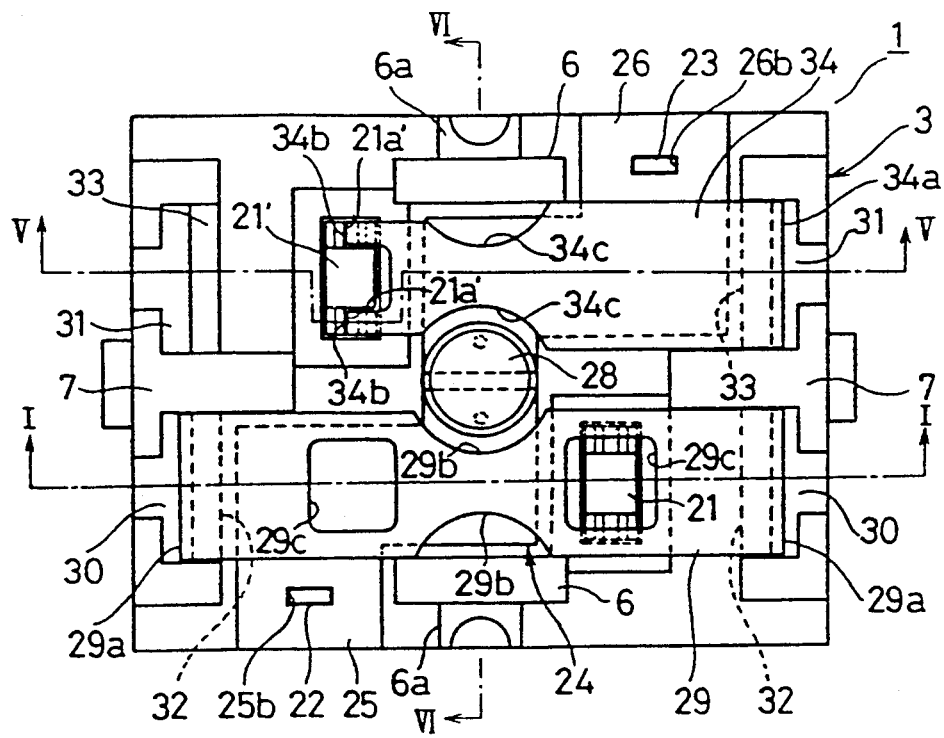
FIG. 2 is a plan view of FIG. 1.
Figure 3:
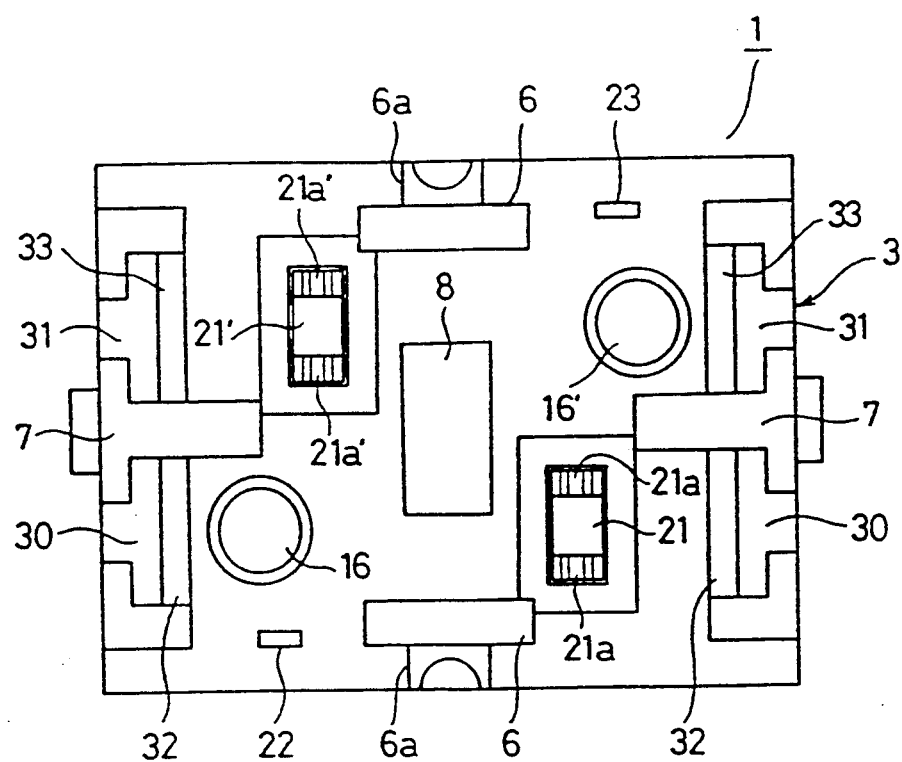
FIG. 3 is a plan view wherein a portion of FIG. 2 is removed.
Figure 4:
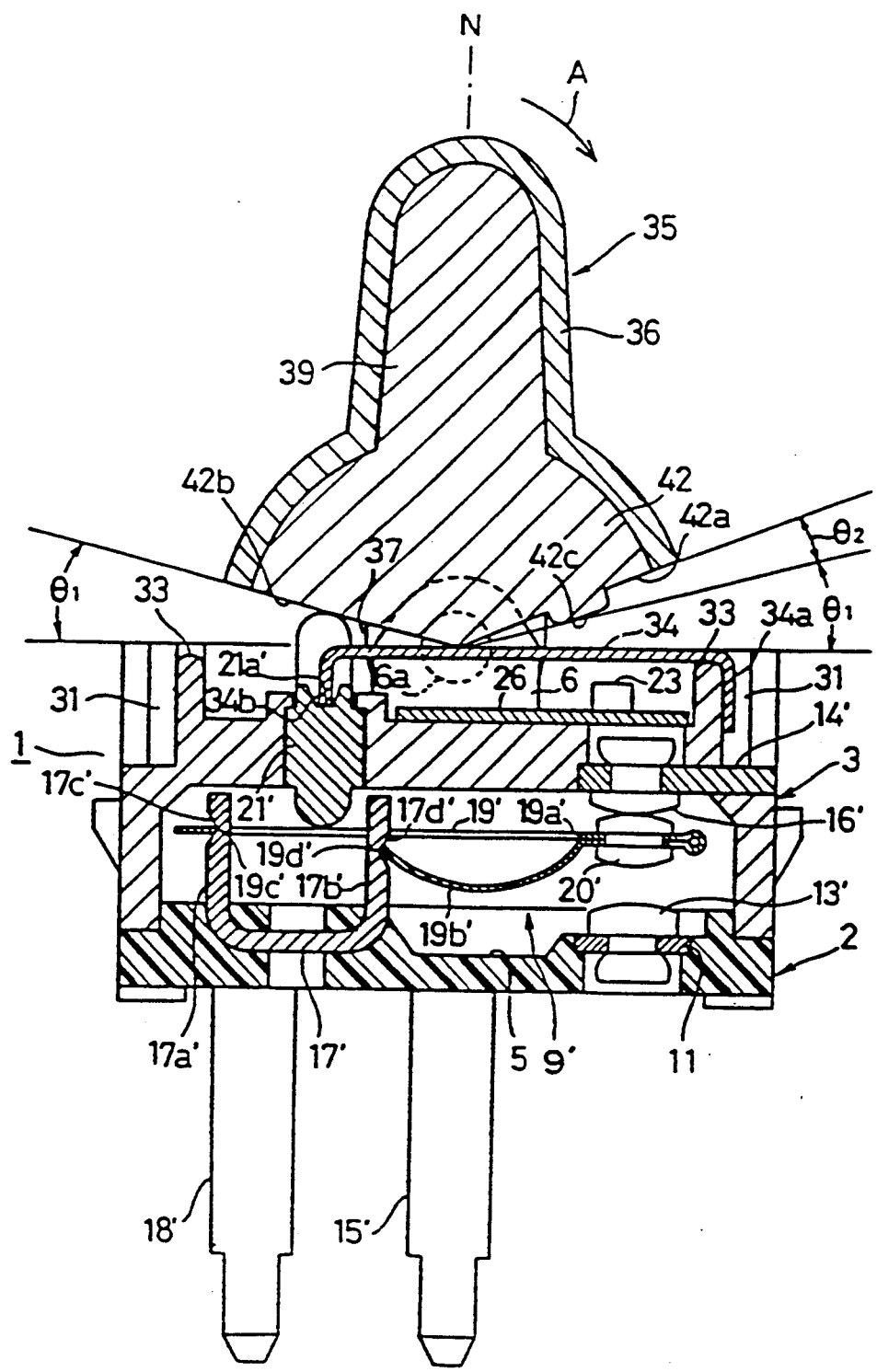
FIG. 4 is a cross-sectional view taken along the line V—V of FIG. 2.
Figure 5:
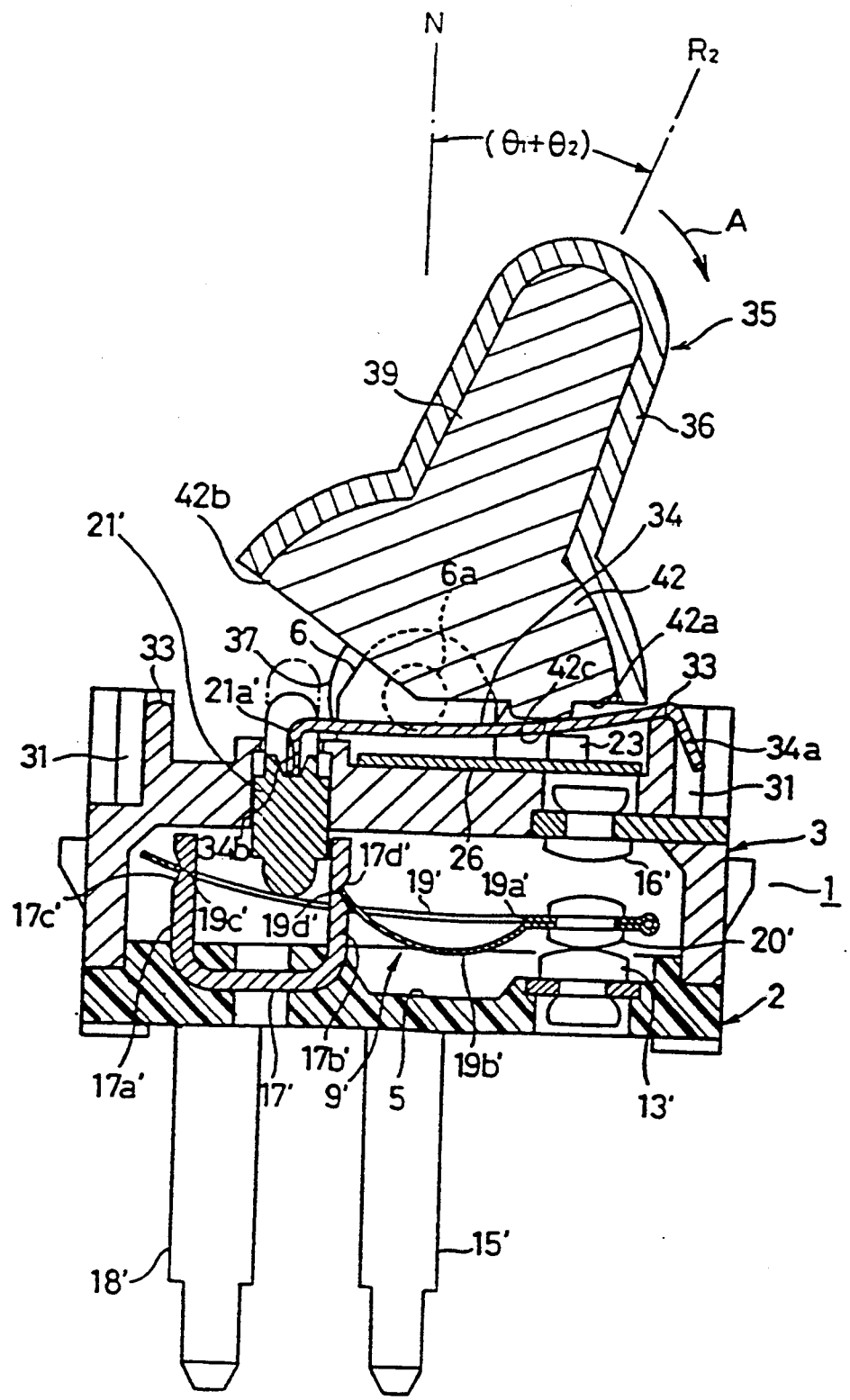
FIG. 5 is a sectional view of the switch device showing a subsequent operated situation changed from a situation shown in FIG. 2.
Figure 6:
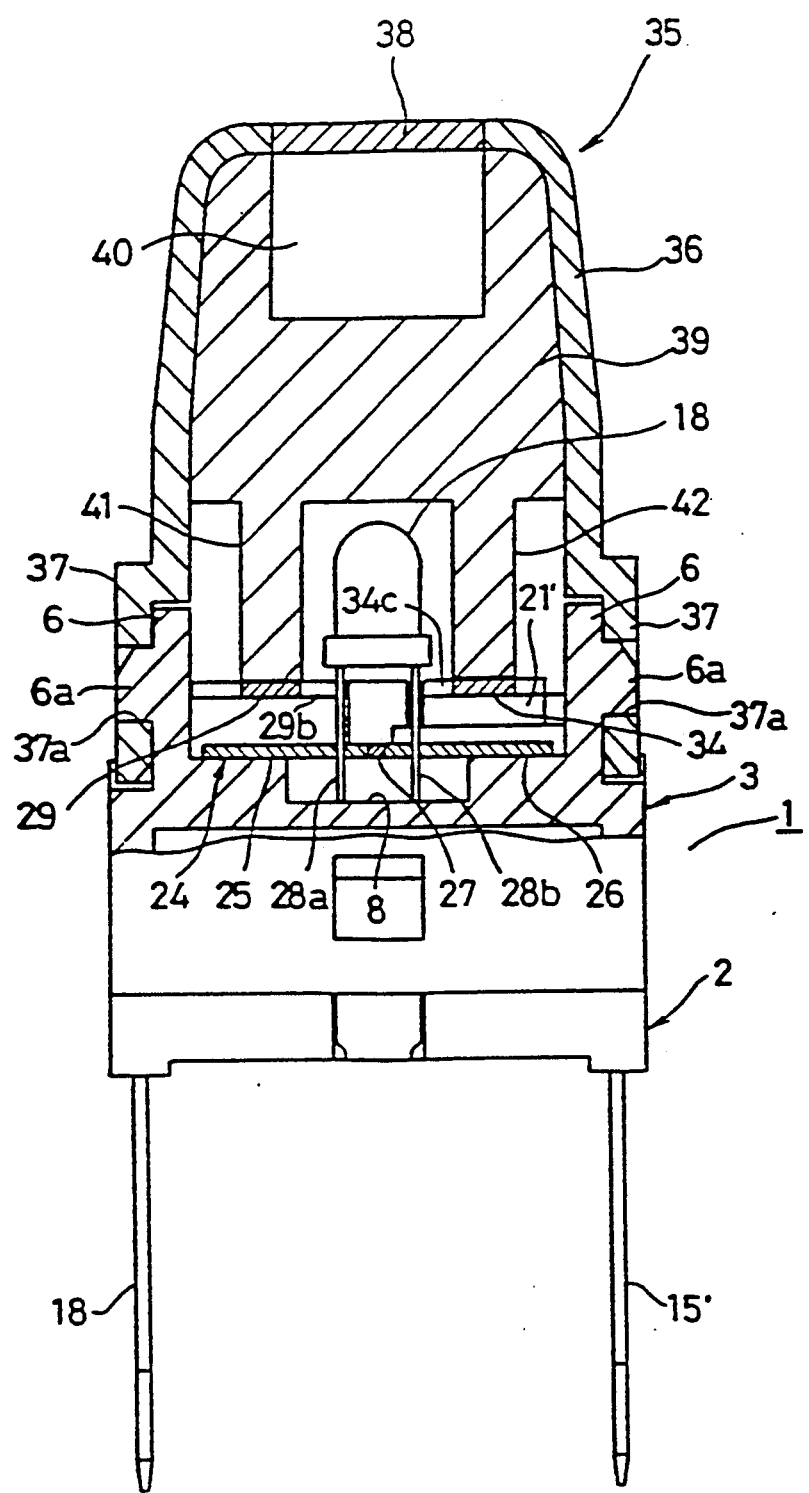
FIG. 6 is a cross-sectional view taken along the line VI—VI of FIG. 2.
Figure 7:
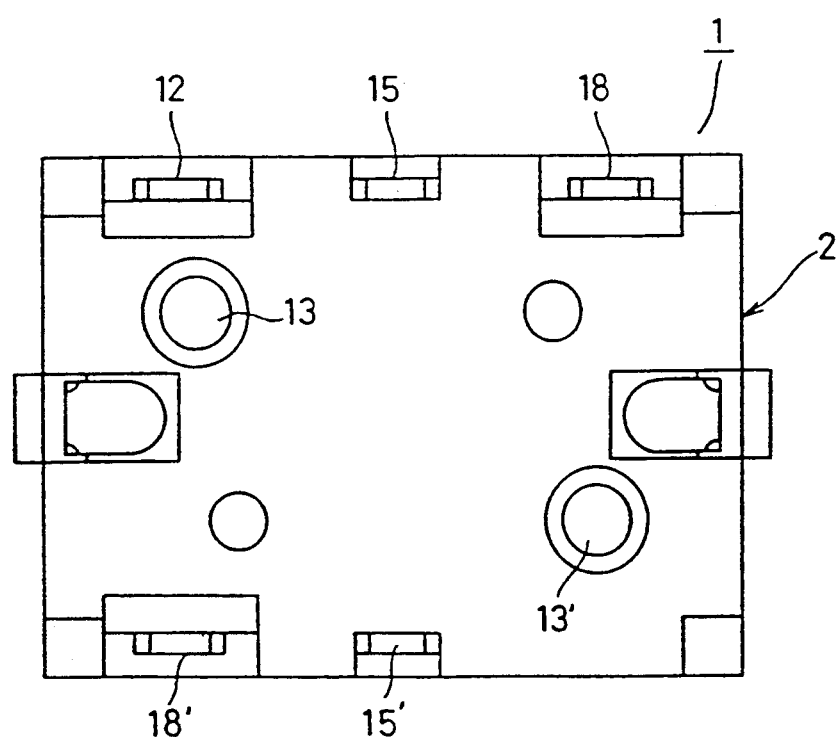
FIG. 7 is a bottom view of FIG. 1.

As shown in FIGS. 1 to 9 and 15, a switch device 1 comprises a substantially rectangular plastic base 2 and a substantially rectangular case 3 having an open bottom surface. The case 2 is mounted by tightly fitting it on the upper perimeter of the base 2. As shown in FIGS. 1 and 5, recessed portions 4 and 5 are formed in parallel on the upper surface of the base 2. Further, as shown in FIGS. 2 and 3, the case 3 is formed as a rectangular flat shape having a long side and a short side, and brackets 6 are projected upward (in the upper direction in FIG. 4) at the center of the case 3 in the longitudinal direction (in the horizontal direction in FIG. 2) and from the edges of the case 3 in the lateral direction thereof (in the vertical direction in FIG. 2). These brackets 6 are coaxially provided with pins 6a directed in the direction along which they are separated from each other and these pins support a knob 35. In addition, knob stoppers 7 project from the upper edges at opposite ends of the case 3 in the longitudinal direction thereof to restrict the rotational angle of the knob 35.

Figure 15:
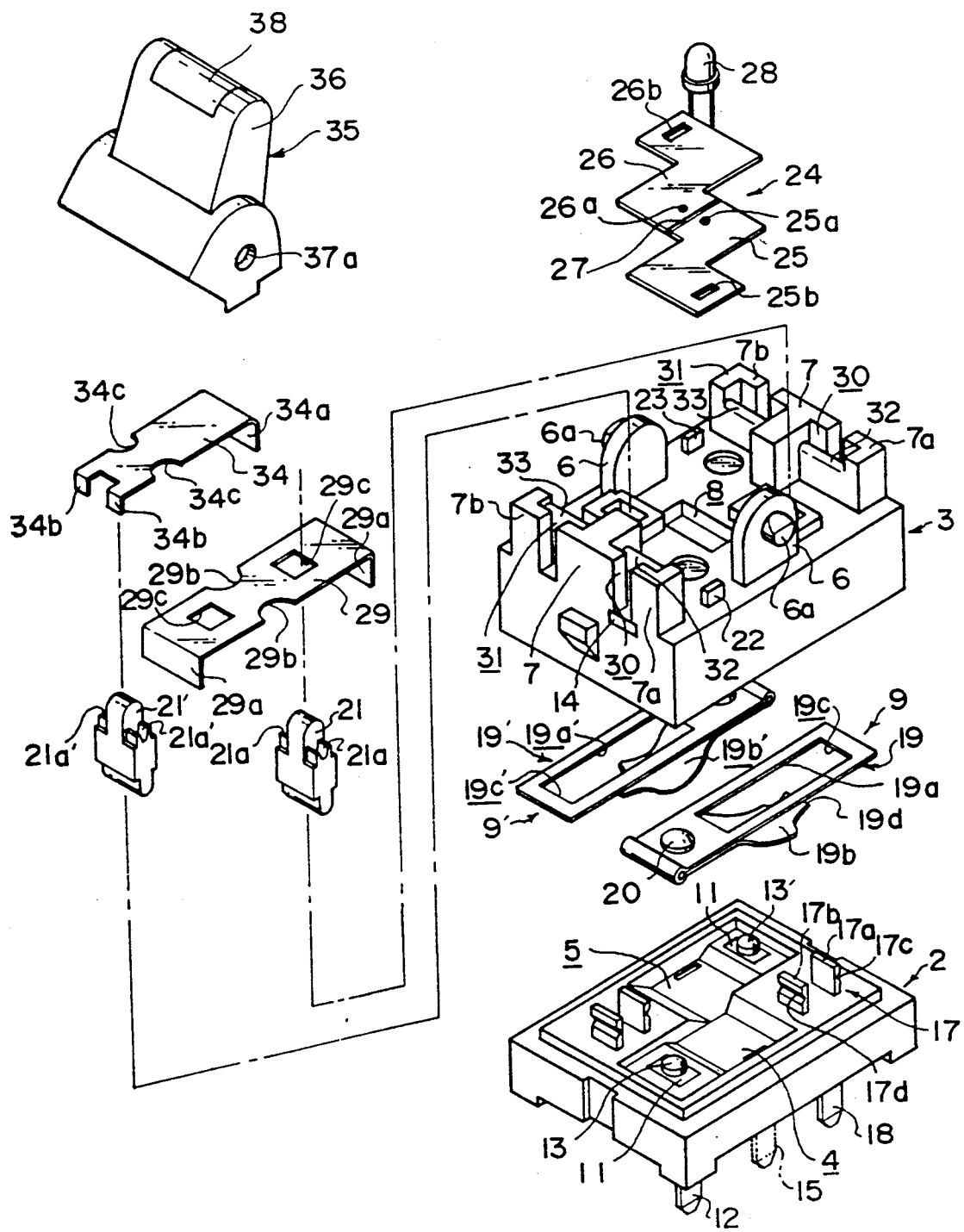
FIG. 15 is an exploded perspective view of an embodiment according to the present invention.

In FIGS. 1 and 15, a first switch 9 is disposed in the base 2 and the case 3 directly above and in correspondence to the recessed portion 4 of the base. A fixed contact conductor 11 is fixed to the base 2 by insert molding and a portion thereof is extended to serve as a terminal 12 projecting downward from the base 2. A portion of the fixed contact conductor 11 is exposed in the recessed portion 4 and the open-at-rest side fixed contact 13 is fixed to the exposed portion to form the resting open side of the switch. A fixed contact conductor 14 is fixed to the case 3 by insert molding and a portion thereof extends therefrom to serve as a terminal 15 projecting downward from the base 2. The fixed contact conductor 14 has a portion which faces the fixed contact 13 and is exposed in the lower surface of the case 3 and a cylindrical closed at rest fixed contact 16 is fixed to the exposed portion.

A terminal 17 is buried in the base 2. The terminal 17 is composed of a conductive plate formed into a substantially U-shape and fixed to the base 2 by insert molding. The terminal 17 has first and second support portions 17a and 17b projecting upward from the base 2 and notch-shaped locking portions 17c and 17d formed on the two opposite surfaces thereof, respectively, and the locking portion 17d of the second support portion 17b is located at a position lower than the locking portion 17c of the first support portion 17a, that is, nearer to the base 2. Note that the terminal 17 has a terminal 18 projecting downward from the base 2 (refer to FIG. 7).

A movable contact plate 19 composed of leaf spring is disposed so as to correspond to the terminal 17. The contact plate 19 comprises an upper side section having a hole 19a and a lower side section having a curved portion 19b. The movable contact plate 19 is bent and folded at an intermediate portion, namely the free ends of the upper side and lower side sections, where a cylindrical movable contact 20 is disposed. A fulcrum 19c at the right edge of the hole 19a is locked to the locking portion 17c of the first support 17a of the terminal 17 and a fulcrum 19d at the base portion of the curved portion 19b is locked to the locking portion 17d of the second support 17b. In the above state, a displacement force is applied to the movable contact plate 19 by a spring action of the curved portion 19b so that the free end thereof is directed in an obliquely upward direction in FIG. 1, and the upward component of this force causes the movable contact 20 to be brought into contact with the resting closed side fixed contact 16 by virtue of contact pressure.

A first actuator 21 mounted to the case 3 so that it is vertically movable, has a lower edge which is held in abutment against the base end of the movable contact plate 19.

In FIG. 4, numeral 9' designates a second switch disposed in the base 2 and the case 3 in correspondence to the recessed portion 5 in a direction opposite to and in parallel with the above switch 9. The switch 9' has the same arrangement as that of the switch 9 and those parts thereof which are identical to those of the switch 9 are designated by identical reference characters with (').

Thus, the fixed contact conductor 11 is common to the switches 9 and 9' and has a positive side auxiliary terminal 22 (refer to FIGS. 2 and 3) extending upward from the vicinity of the fixed contact 13 and the upper end thereof projects upward from the upper surface of the case 3. Further, a fixed contact conductor 14' has a negative side auxiliary terminal 23 extending upward from the vicinity of a fixed contact 16' and the upper end thereof projects upward from the upper surface of the case 3.

Figure 10:
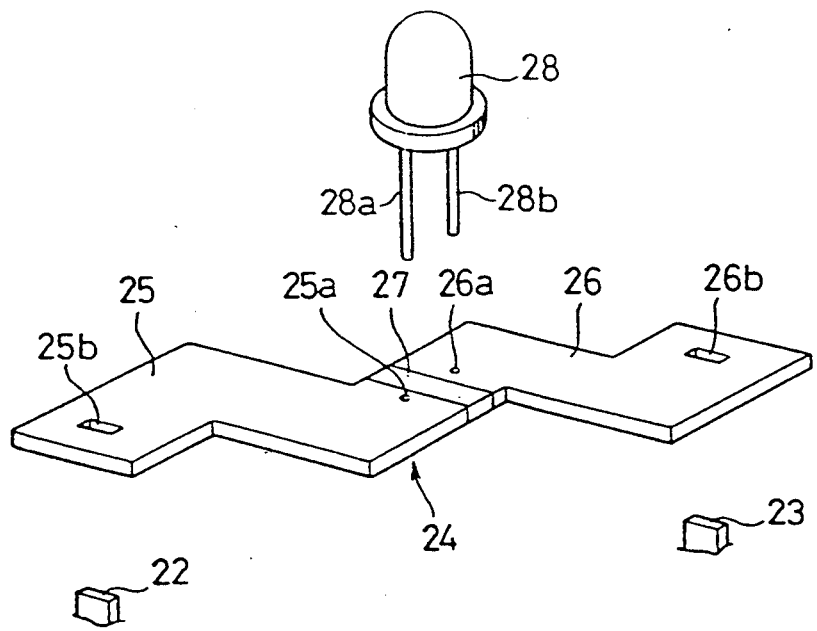
FIG. 10 is a perspective view showing a connecting member.

FIG. 10 shows a rubber connecting member 24 mounted on the case 3. The rubber connecting member 24 is a so-called zigzag plate member having an insulating region 27 at the center, joining a crown-shaped positive side connecting member 25 to a crown-shaped negative side connecting member 26. The positive and negative side connecting members 25 and 26 respectively have mounting holes 25a and 26a of small diameter formed in the ends which are joined by through insulating region 27 and substantially rectangular insert holes 25b and 26b formed in an external end of the connecting members 25 and 26, respectively. The positive and negative side connecting members 25 and 26 comprise a resistance member having a predetermined resistance value formed by mixing a conducting material with rubber, and the insulating region 27 comprises a member of very high resistance formed of rubber with no conducting material included. The connecting member 24 is placed on the upper surface of the case 3 so that the positive side auxiliary terminal 22 of the above fixed contact conductor 11 is inserted into the insert hole 25b and the negative side auxiliary terminal 23 of the above fixed contact conductor 14' is inserted into the insert hole 26b. In this arrangement, the positive and negative side connecting members 25 and 26 are electrically connected to the fixed contact conductors 11 and 14' through the positive and negative side auxiliary terminals 22 and 23.

In this case, the insulating region 27 as a middle portion of the connecting member 24 is located at the center of a rectangular recessed portion 8 formed at the center of the case 3. A light emitting element 28 as an illuminating lamp (e.g., light emitting diode) has an anode side terminal 28a as one terminal and a cathode side terminal 28b as the other terminal inserted into the mounting holes 25a and 26a, respectively, of the positive and negative side connecting members 25 and 26 of the above connecting member 24. More specifically, the terminals 28a and 28b of the light emitting diode 28 are connected to the connecting members 25 and 26 respectively across the insulating region 27.

Figure 11:
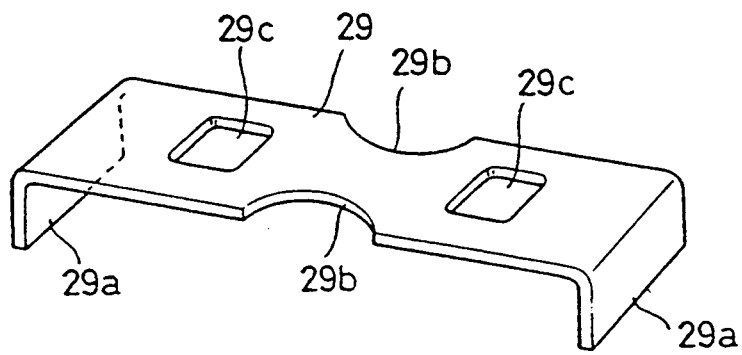
FIG. 11 is a perspective view showing a return member.

As shown in FIGS. 2, 11 and 15, a return member 29 composed of leaf spring is formed into a long shape and has engaging pieces 29a bent downward at each end thereof, arc-shaped recessed clearance portions 29b formed at the center thereof, and rectangular clearance holes 29c located at the right and left sides thereof.

As shown in FIGS. 2 and 3, formed on the upper surface of the above case 3 are T-shaped recessed engaging portions 30 and 31 positioned between knob stoppers 7 and L-shaped lugs 7a and 7b standing in the vicinity thereof. Support lugs 32 and 33 which are a little lower than the above knob stoppers 7 are formed so that the T-shaped heads of the recessed engaging portions 30 and 31 are separated from and do not contact the other portions. As shown in FIGS. 1 and 2, the return member 29 is placed between the support lugs 32, and the engaging pieces 29a thereof are inserted into the engaging recesses 30, respectively. The upper end of the actuator 21 passes through the clearance holes 29c of the return member 29 to prevent interference thereof, and the recessed clearance portions 29b are arranged to clear the light emitting diode 28.

Figure 12:
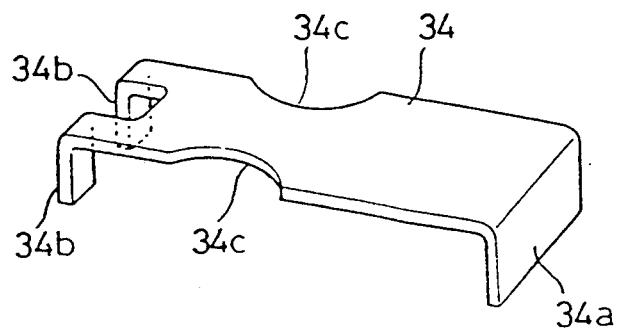
FIG. 12 is a perspective view showing an interlock lever.

As shown by FIGS. 2, 12 and 15, the long actuating member 34 has one end at which an engaging piece 34a projecting downward is provided and another end at which a fork-shaped locking member 34b projecting downward is provided. Further, as shown in FIGS. 2 to 4 and 15, the first and second actuators 21 and 21' are formed in such a way that the opposite sides thereof are located at positions lower than the center thereof and locking recessed portions 21a and 21a' are formed in the front and back sides thereof. As shown in FIGS. 2 and 4, the actuating member 34 is placed on the support 33 in the vicinity of the engaging piece 34a, and the engaging piece 34a is inserted into and engaged with the recessed engaging portions 31, and the engaging piece 34b is inserted into and locked with the recessed locking portion 21a' of the actuator 21'. In this situation, one of the recessed clearance portions 34c of the actuating member 34 serves to clear the light emitting diode 28.

Denoted by 35 is the knob, which will be described below with reference to FIGS. 1 and 4. The knob 35 comprises a plastic knob main body 36 and support pieces 37 projecting downward from the front and back sides thereof, and the support holes 37a of the support pieces 37 are engaged with the support lugs 6a of support pieces 6, whereby the main body of the knob is supported by the case 3 so that it can be swung in the direction of arrow A and in the opposite direction.

A transparent display plate 38 with characters, for example, "AUTO" is attached to the upper end of the knob main body 36. A light guide 39 composed of acrylic resin is formed integrally with and disposed in the knob main body, and is provided with a recessed portion 40 corresponding to the above display plate 38. The light guide 39 has protrusion for pressing projections 41 and 42 formed thereon in correspondence to the above return member 29 and the actuating member 34. As shown in FIG. 1, a regulating lug 43 is defined at the center of the pressing projection 41. The right lower surface 41a of the pressing projection 41 is formed so that it has an angle of $(\theta_1+\theta_2)$ with respect to the upper surface of the knob stopper 7 about the center of rotation (the center of the support lug 6a and the support hole 37a), and the left lower surface 41b thereof is formed such that it has an angle $\theta_1$. Note that in the figure the angle $\theta_1$ is set to, for example 14° and the angle $\theta_2$ is set to, for example, 7°. In this situation, the lower surface of the regulating lug 43 in the knob 35 is brought into contact with the upper central surface of the return member 29 in a plane contact state, whereby the knob 35 is held at the neutral position shown in FIGS. 1 and 4. Further, the pressing lug 41c in the knob 35 is held in abutment against the upper end portion of the actuator 21. The pressing projection 42 is arranged in a similar way to the pressing projection 41, and as shown in FIG. 4, has a right lower surface 42a, a left lower surface 42b and pressing lug 42c formed thereon similar to the right lower surface 41a, the left lower surface 41b and the pressing projection 41c. The left lower surface 42b is held in abutment against the upper end portion of the actuator 21'.

Figure 14:
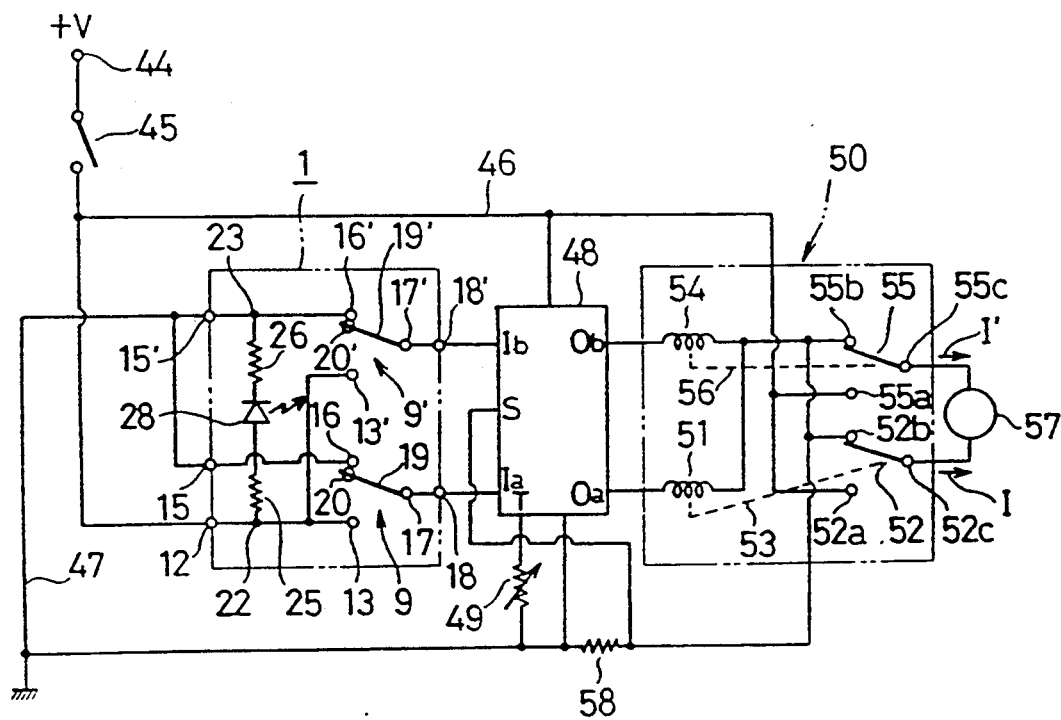
FIG. 14 is a circuit diagram of an embodiment.

Next, an electrical arrangement will be described below with reference to FIG. 14, wherein 44 designates a positive electrode (power supply voltage + V) of a battery as a DC power supply having a grounded negative electrode, the positive electrode being connected to a power supply line 46 through an ignition switch 45. The terminal 12 of the first switch 9 is connected to the power supply line 46 and the terminal 15 is connected to the terminal 15' of the second switch 9' and at the same time grounded through a ground line 47. Designated at numeral 48 is a detection control circuit connected across the power supply line 46 and the ground line 47 and having input terminals Ia and Ib connected to the terminals 18 and 18' of the switch 9 and 9' and an external connection terminal T connected to the ground line 47 through a variable resistance 49. Designated at 50 is a relay circuit functioning as a drive circuit comprising a window-lowering relay 53 including an exciting coil 51, and a switching type relay switch 52; and a raising switch 56, including an exciting coil 54 and a switching type relay switch 55. One of the terminals of each of the exciting coils 51 and 54 is connected to the output terminals Oa and Ob of the detection control circuit 48 and the other terminals are connected to the power supply line 46. The open-at-rest contacts 52a and 55a of the relay switches 52 and 55 are connected to the power supply line 46 and a DC motor 57 as a load is connected across the movable contacts 52c and 55c thereof. The DC motor 57 is used to raise and lower the driver's side window of an automobile. The closed-at-rest fixed contacts 52b and 55b of the relay switches 52 and 55 are connected together and also to the detection terminal S of the detection control circuit 48 as well as to the ground line 47 through a detection resistance 58. As shown in FIG. 13, when the input signals of both the input terminals Ia and Ib of the above detection control circuit 48 are at a low level L, the detection control circuit 48 makes and emits from the output terminals Oa and Ob an output signals at a low level L (ground potential), when the input signal of the input terminal Ia is at a high level H and the input signal of the input terminal Ib is at a low level L, the detection control circuit 48 makes and emits from the output terminal Oa an output signal at a high level H (power supply potential + V), only while this state is maintained, and when the input to the input terminal Ia is a low level L and the input signal to the input terminal Ib is at a high level H, the detection control circuit 48 makes and emits from the output terminal Ob an output signals at a high level H, only while this state is maintained. When both inputs to the input terminals Ia and Ib are at a high level H, the detection control circuit 48 makes and emits from the output terminal Oa an output signal at a high level H and keeps emitting the output signal from the output terminal Oa at a high level even if the state of the above input signals is changed. Thereafter, when the movement of the window glass is completed, the DC motor 57 is locked, and the voltage detected across the terminals of the detection resistance 58 becomes equal to or more than a set value, causing the above output signal from the output terminal Oa to be returned to a low level L. Note that the variable resistance 49 connected to the external connection terminal T of the detection control circuit 48 is used to adjust the above set value.

Next, operation of this embodiment will be described. First, in FIGS. 1 and 4, a displacement force in an obliquely upward direction is applied to the free ends of the movable contact plates 19 and 19' by a spring force produced by the curved portions 19b and 19b' of these movable contact plates, and the upward component thereof keeps the movable contacts 20 and 20' in a returned-to-rest state in which they are brought into contact with the closed-at-rest fixed contacts 16 and 16'. When the ignition switch 45 is turned on in this state, an energizing circuit for the light emitting diode 28 is formed through the positive electrode 44 of the battery, the ignition switch 45, the terminal 12, the positive side auxiliary terminal 22, the positive side connection member (resistance member) 25, the light emitting diode 28, the negative side connection member (resistance member) 26, the negative side auxiliary terminal 23, the terminal 15', and the ground, whereby the light emitting diode emits light to illuminate the display plate 38 of the knob 35 supported by the support pieces 6 of the case 3. Further, since the terminals 18 and 18' have the ground potential when the movable contacts 20 and 20' of the switches 9 and 9' are brought into contact with the closed-at-rest fixed contacts 16 and 16' (that is, when the closed-at-rest contacts are closed and the open-at-rest contacts are open), both the input signal of input terminal Ia and of terminal Ib of the detection control circuit 48 are at a low level L and both the output signals from the output terminals Oa and ob thereof are also at a low level L. Therefore, the relay switches 52 and 55 of the respective relays 53 and 56 are in the state shown in FIG. 14, and thus both ends of the DC motor 57 have the ground potential and thus no current is supplied to the DC motor 57 (stop control mode).

Figure 8:
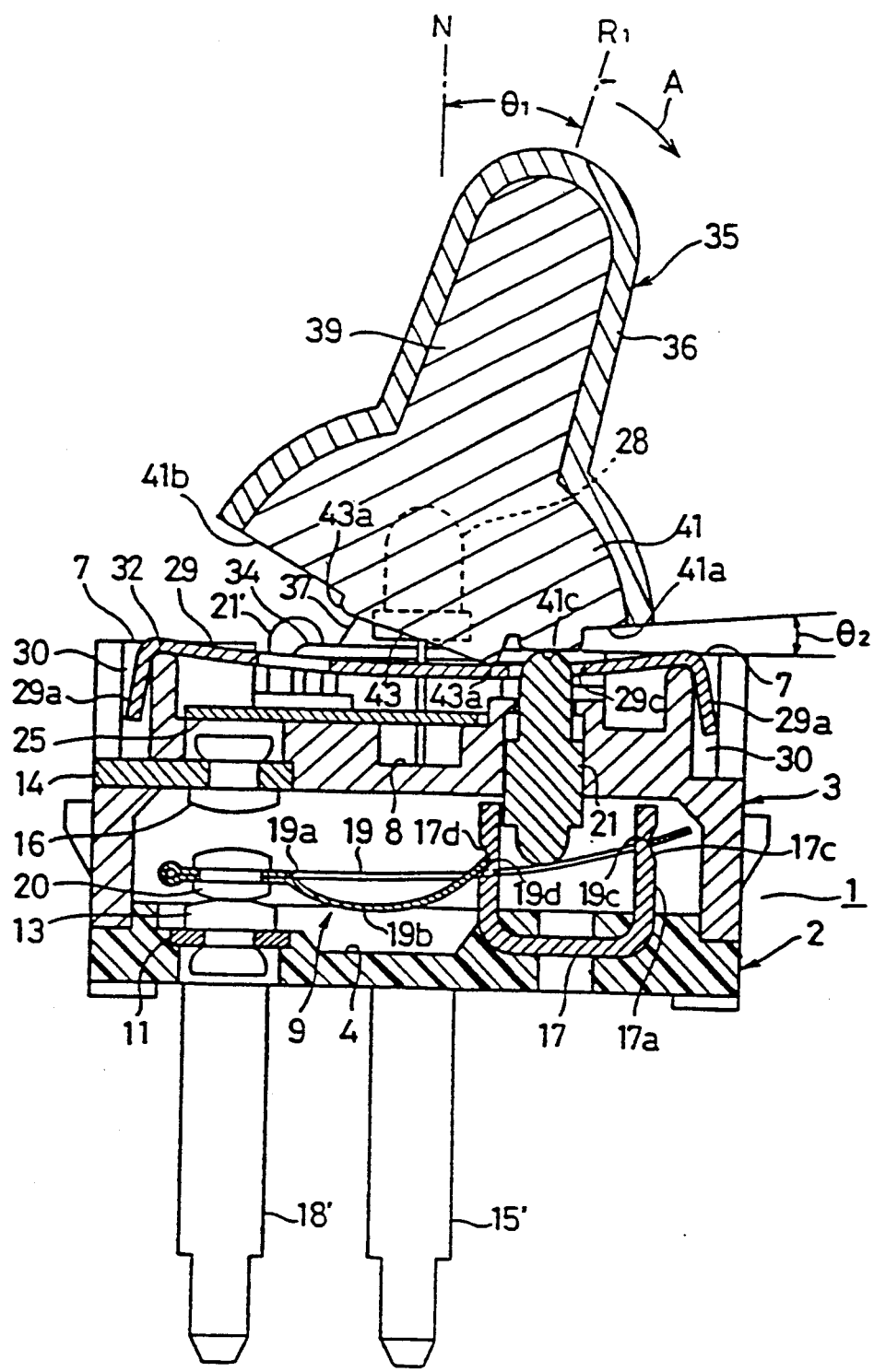
FIG. 8 is a diagram showing the operation of the switch of FIG. 2.

When the knob 35 is swung or turned by the angle $\theta_1$ in the direction of arrow A from the neutral position N so as to be located at a first right side position R$_1$, as shown in FIG. 8, the right corner 43a of the corners 43a of the regulating lug 43 presses the return member 29. Therefore, the return member 29 is deflected and deformed downward and the reaction thereof applies a return turning force to the knob 35 in a direction opposite to the direction of the arrow A. Further, the knob 35 turning in the arrow A direction causes the pressing lug 41c to press the first actuator 21. Therefore, the base of the movable contact plate 19 is deformed in a curved and displaced downward.

Thereafter, when the base of the movable contact plate 19 is located below the portion (the locking portion 17d) where the second support portion 17b is locked to the fulcrum 19d, an obliquely downward displacing force is applied to the free end of the movable contact plate 19 by the spring force of the curve portion 19b and the free end is quickly moved downward by the downward component thereof, whereby a snap action is effected to enable to movable contact 20 to be spaced apart from the closed-at-rest fixed contact 16 and to be brought into contact with the open-at-rest fixed contact 13 (so that the closed-at-rest contact is open and the open-at-reset contact is closed). With this arrangement, since the terminal 18 has the power supply potential +V, an input signal of the input terminal Ia of the detection control circuit 48 is made at a high level H and an output signal from the output terminal Oa thereof is emitted at a high level H (power supply voltage +V).

Therefore, the exciting coil 51 is energized to operate the window-lowering relay 53, which enables the movable contact 52c of the relay switch 52 to be brought into contact with the fixed contact 52a (causing the switch 52 to be turned on). As a result, an energizing circuit for turning the DC motor 57 in the positive direction is formed through the positive electrode 44 of the battery, the ignition switch 45, the fixed and movable contacts 52a and 52c of the relay switch 52, the DC motor 57, the movable and fixed contacts 55c and 55b of the relay switch 55, the detection resistance 58, and the ground by way of illustration, and thus a current I flows through the DC motor 57 to enable it to be positively turned, whereby the driver's side window is lowered (lowering control mode).

Thereafter, when the force turning the knob 35 in the direction of arrow A is removed, the knob is turned in the opposite direction to arrow A by the spring force of the return member 29 until it returns to the neutral position N. Therefore, when the pressing force applied to the actuator 21 by the knob 35 is removed, the movable contact plate 19 is restored by the spring force of 29, so that the base thereof is then located at a position higher than the fulcrum 19d, and an obliquely upward displacing force is applied to the free end by the spring force of the curved portion 19b. Therefore, the free end is quickly moved upward and thus a snap action is effected to enable the movable contact 20 to be spaced apart from the open-at-rest fixed contact 13 and brought into contact with the closed-at-rest fixed contact 16, and thus the state in FIG. 1 is restored.

Accordingly, since the terminal 18 again has the ground potential, an input signal at the input terminal Ia and an output signal emitted from the output terminal Oa of the detection control circuit 48 are at a low level L. As a result, the exiting coil 51 is deenergized to enable the window-lowering relay 53 to be returned-to-rest and the movable contact 52c of the relay switch 52 to be separated from the fixed contact 52a (so as to open or turned off switch 52) and brought into contact with the fixed contact 52b.

As a result, the above positive turning circuit of the DC motor 57 is cut off and thus the driver's side window is stopped when it reaches a completely lowered position.

Although the above description applies to the case in which the first switch 9 is operated, the case in which the second switch 9' is operated is substantially the same as the above case. More specifically, when the knob 35 is turned in a direction opposite to the direction of arrow A from the neutral position N, the left lower surface 42b of the pressing projection 42 of the knob 35 presses the second actuator 21' downward and thus the movable contact plate 19' enables the movable contact 20' to be brought into contact with the open-at-rest fixed contact 13' (the open-at-rest contact is closed). Since the terminal 18' has the power supply voltage +V at this time, an input signal at the input terminal Ib of the detection control circuit 48 is made at a high level H and an output signal is emitted from the output terminal Ob thereof, the output also being made at a high level H (power supply voltage +V). With this arrangement, the exciting coil 54 is energized, and thus the window-raising relay 56 is operated and the movable contact 55c of the relay switch 55 is brought into contact with the fixed contact 55a. As a result, a circuit for turning the DC motor in the reverse direction is formed through the positive electrode 44 of the battery, the ignition switch 45, the fixed and movable contacts 55a and 55c of the relay switch 55, the DC motor 57, the movable and fixed contacts 52c and 52b of the relay switch 52, the detection resistance 58, an the ground, and a current I flows through the DC motor 57 to enable it to be turned in a reverse direction, whereby the driver's side window is raised (raising control mode). Thereafter, when the force turning the knob 35 in a direction opposite to the direction of arrow A is removed, the knob is turned in the direction of arrow A by the spring force of the return member 29 and returns to the neutral position N, and thus the switch 9' is returned to the state shown in FIG. 4.

Figure 9:
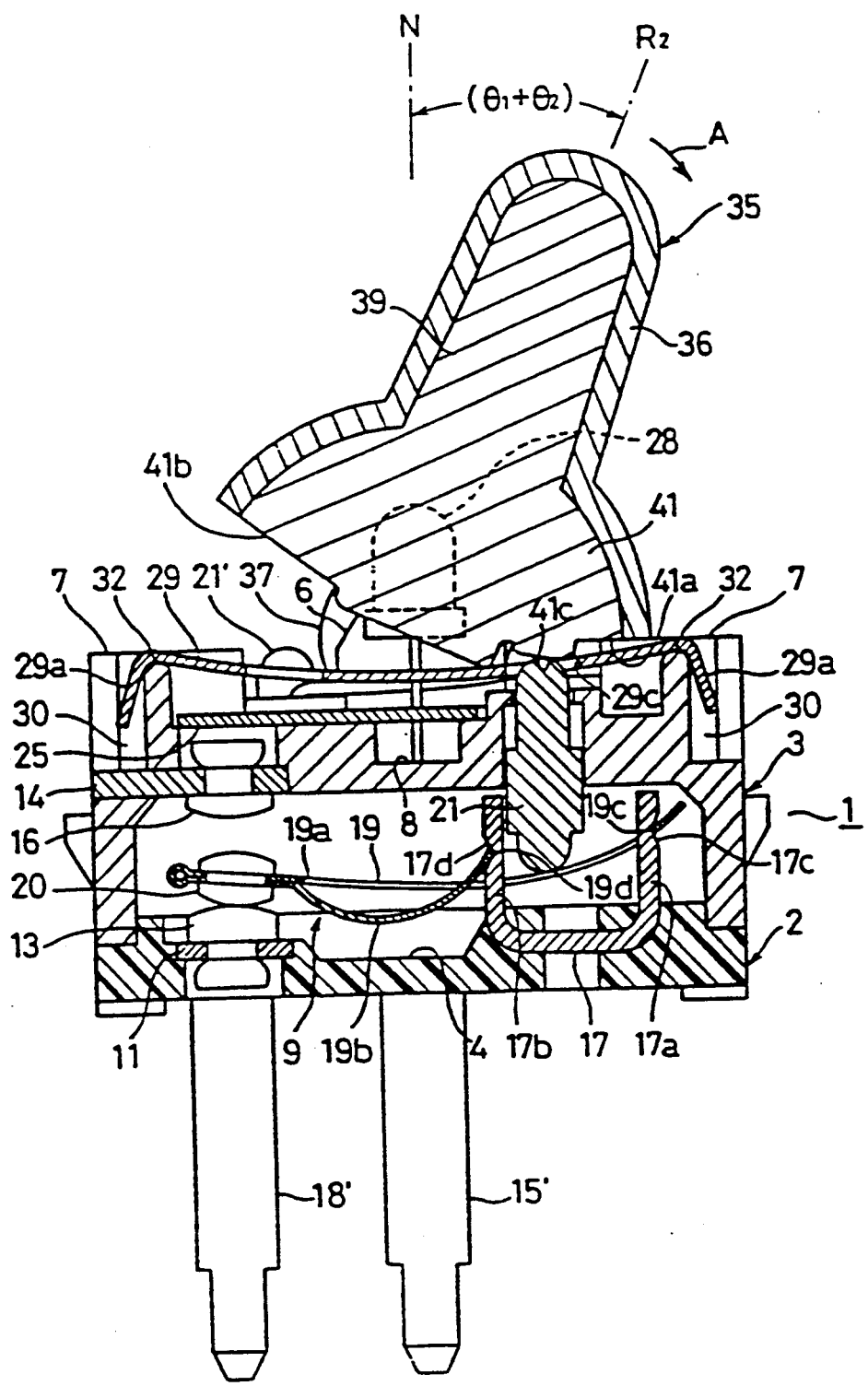
FIG. 9 is a diagram showing the operation of the switch of FIG. 1 having a swing angle larger than that of FIG. 7.

As shown in FIGS. 5 and 9, when the knob 35 is turned by an angle of $(\theta_1 + \theta_2)$ degrees in the direction of arrow A, that is, when it is further turned by the angle $\theta_2$ from the state shown in FIG. 8 and located at a second right side position $R_2$, the first actuator 21 is pressed farther than in the state shown in FIG. 8 by the pressing lug 41c. As shown in FIG. 9, the first switch 9 enables the movable contact 20 to be separated from the closed-at-rest fixed contact 16 and held in contact with the open-at-rest fixed contact 13.

Then, when the knob 35 is turned to the second right side position $R_2$ as described above, the pressing lug $42_c$ of the pressing projection 42 presses the actuating member 34, as shown in FIG. 5, and thus the actuating member 34 is turned downward, rotating about the right support lug 33, to press the second actuator 21'. In this arrangement, the second switch 9' is switched to enable the movable contact 20' to be spaced apart from the closed-at-rest fixed contact 16' and brougnt into contact with the open-at-rest fixed contact 13'. More specifically, when the knob 35 is turned to the second right side position $R_2$ from the neutral position N, both the switches 9 and 9' are switched such that the closed-at-rest contact thereof is opened and the open-at-rest contact thereof is closed.

With this arrangement, since both the terminals 18 and 18' have the power supply voltage +V, the input signal at the input terminal Ia and that of Ib of the detection control circuit 48 are both made at a high level H and the output signal emitted from the output terminal Oa thereof is also at a high level H. Therefore, as described above, when the window-lowering relay 53 is operated, a positive turning current circuit similar to the above mentioned is formed to turn the DC motor 57 in a positive direction, whereby the driver's side window is lowered.

Thereafter, when the force turning the knob 35 in the arrow A direction is removed, the knob is returned to the neutral position N by the spring force of the return member 29. In this arrangement, the pressing force applied to the first actuator 21 by the pressing lug 41c and the pressing force applied to the second actuator 21' by the actuating member 34 are removed, so that the switches 9 and 9' are returned to the states shown in FIGS. 1 and 4.

Therefore, both the terminals 18 and 18' have the ground potential and are changed so that the input signals of the input terminal Ia and of Ib of the detection control circuit 48 are both made at a low level L, but the detection control circuit 48 keeps emitting an output signal from the output terminal Oa at a high level H regardless of the change of the state of the input signals. Therefore, a continuous energizing circuit is formed to continuously turn the DC motor in a positive direction 57, whereby the driver's side window is continuously lowered until the window is completely open (automatic lowering control mode).

Since the window is restricted from being further lowered when it is lowered to the lowest position, a locking current larger than the usual current I is conducted through the DC motor 57 and also through the detection resistance 58. As a result, the voltage produced across both the terminals of the detection resistance 58 is larger than the usual value, i.e., it has a value larger than a value adjusted and set by the variable resistance 49; and the detection control circuit 48 detects the increase in voltage, and in response, returns the output signal emitted from the output terminal Oa to a low level L. As a result, the lowering relay 53 is returned, whereby the continuous (positive turn) energizing circuit of the DC motor 57 is cut off.

According to this embodiment, the following effects can be obtained.

The switching states of the switch 9 and 9' of the switch device 1 are detected by the detection control circuit 48 as the four states, "L, L, ", "H, L", "l, H", and "H, H" of input signals at the input terminals Ia and Ib. A power supply stop state, positive turn energizing circuit, reverse turn energizing circuit, and continuous positive turn energizing circuit of the DC motor 57 are formed to execute four control modes by which the driver's side window is stopped, lowered, raised, and automatically lowered by the operation of and returning the relays 53 and 56 of the relay circuit 50 in accordance with the detection. As a result, the provision of an automatic lowering switch is not needed to execute the automatic lowering control mode separately from and independently of a conventional switch device, and therefore, the switch device 1 is arranged more simply and conveniently and the cost thereof is reduced.

Further, when the knob 35 is turned in the direction of arrow A to the first right side position $R_1$ from the neutral position N, the first actuator 21 is pressed by the pressing lug 41c of the knob 35 to enable the first switch 9 to be switched. When the knob 35 is turned in the direction opposite to the direction of arrow A from the neutral position N, the second actuator 21' is pressed by the left lower surface 42b of the knob 35 to enable the second switch 9' to be switched. Then, when the knob 35 is turned in the arrow A direction to the second right side position $R_2$ from the neutral position N, the first actuator 21 is pressed by the pressing lug 41c of the knob 35 to enable the switch 9 to be switched and the actuating member 34 is pressed by the pressing lug 42c of the knob 35 to press the second actuator 21' through the actuating member 34, whereby the second switch 9' is switched. Therefore, the single switch device 1 is provided with the function of selectively switching one of the switches 9 and 9' and the function of simultaneously switching both the switches 9 and 9'. As a result, there is an advanatage in that the cost of the switch device is reduced and only one mounting space is needed as compared with, for example, the case in which two kinds of switch devices having the above two respective functions are provided.

Further, the switches 9 and 9' in the switch device 1 are the same as those in a usual switch device which are selectively switched by actuating a knob. On the other hand, the above two functions can be provided by a minor modification in that the knob 35 is used in place of a usual knob and the actuators 21 and 21' having the locking recessed portions 21a and 21a' are used in place of a usual actuator and by a simple arrangement, namely, the provision of the actuating member 34 in the case 3. Therefore, the same mechanical parts as those used in a usual switch device can be readily used and thus a large cost reduction can be expected.

Furthermore, the positive side auxiliary terminal 22 comes from the fixed contact conductor 11 which is connected to the positive electrode 44 of the battery in the switch 9, the negative side auxiliary terminal 23 comes from the fixed contact conductor 14' which is connected to the ground as the negative electrode of the battery in the switch 9' and both the auxiliary terminals 22 and 23 project upward from the upper surface of the case 3. In addition, the connecting member 24 in which positive and negative side connecting members 25 and 26 comprising a resistance member integrally formed with the insulating region 27 interposed therebetween is mounted on the upper surface of the case 3 and the above positive and negative side auxiliary terminals 22 and 23 are relatively inserted into the insert hole 25b and 26b at the opposite ends thereof. And, the anode and cathode side terminals 28a and 28b of the light emitting diode 28 are attached to the mounting holes 25a and 26b of the positive and negative side connecting members 25 and 26 by being inserted therethrough under pressure. Therefore, the light emitting diode 28 can be easily mounted and wired.

Although the present invention is described above with reference to an embodiment applied to a window regulator of an automobile, it is not limited thereto, but applicable to load driving devices in general, and thus the switch device is not limited to the one having the two switches 9 and 9', but may simply have any two on and off switches.

What is claimed is:

1. A switch device having three modes of operation wherein a detecting device detects three distince switching actions undertaken by the operator and emits three kinds of signals in accordance with the respective operations detected so as to activate the appropriate desired responses, comprising:
    (a) a knob used for applying an operating force;
    (b) a first switch operated by operating said knob in one direction by a first predetermined amount of operation so as to achieve a first operating state:

(c) a second switch operated by operating said knob in the other direction by a second predetermined amount of operation so as to achieve a second operating state; and (d) an interlock means for operating said second switch in response to operation of said knob in said one direction by a third predetermined amount of operation of said knob exceeding said first predetermined amount of operation of said knob, whereby, when said knob is operated by said third predetermined amount of operation, said second switch is operated together with said first switch, by which simultaneous operation of said first and second switches, a third operating state is achieved in addition to said first operating state of said first switch and said second operating state of said second switch.

2. A switch device according to claim 1, wherein said knob is swingable reciprocally in the two directions from a neutral position by said operating force.

3. A switch device according to claim 2, wherein said interlock means includes a lever for transmitting a swinging force of said knob to said second switch.

4. A switch device according to claim 3, wherein one end of said lever is supported by a switch case, the other end thereof corresponds to said second switch and an intermediate portion thereof corresponds to said knob.

5. A switch device according to claim 2, wherein said respective switches are provided with actuators movable in a direction tangential to the swinging movement of said knob, and actuators are respectively used for driving the movable contacts of said switches and are respectively disposed at both opposite sides of said knob which is positioned in the neutral position.

6. A switch device according to claim 1, wherein said second switch is provided with an actuator for driving a movable contact, said actuator is driven by said knob, and said interlock means is substantially contacted by said actuator.

7. A switch device according to claim 1, wherein said respective switches comprise movable contact plates each having a first end resiliently supported and a second end provided with a movable contact, and said movable contact plates are arranged such that the longitudinal axes thereof are in parallel, and said second ends thereof are pointed in opposite directions to each other.

8. A switch device according to claim 7, wherein said respective switches are provided with actuators which correspond to said respective movable contact plates to press the same in the plate thickness direction thereof and said actuators are respectively driven by the swinging of said knob in one direction and in the opposite direction.

9. A switch device according to claim 8, wherein said actuator of said second switch has a tip end serving as a contact surface for contacting said knob and an intermediate portion serving as a contact surface for contacting said interlock means.

10. A switch device according to claim 8, wherein a leaf spring is provided to return said knob to a neutral position, said leaf spring having an opening in the intermediate portion thereof through which said actuator passes.

11. A switch device according to claim 7, wherein a light emitting diode for illuminating said knob is interposed between a pair of said movable contact plates whose longitudinal axes are parallel to each other.

12. A switch device according to claim 11, wherein a notch is cut into said interlock means to prevent the interference thereof with said light emitting means.

13. A switch device according to claim 11, wherein a conductive member is interposed between said switches and said interlock means for supporting and electrifying said light emitting diode and supply power thereon in accordance with the operation of said switches.

14. A switch device according to claim 13, wherein said conductive member has a plate shape.

15. A switch device for detecting a first swinging operation in one direction of a knob, a second swinging operation in the opposite direction thereof and a third swinging operation having a swing angle larger than that of said first swinging operation, comprising:

(a) a switch case for supporting said knob;

(b) a first switch disposed in said switch case and having a first movable contact operated by said first swinging operation so as to achieve a first operating state;

(c) a second switch disposed next to said first switch in said case and having a second movable contact operated by a second swinging operation so as to achieve a second operating state;

(d) an interlock lever supported by said switch case and operating said second movable contact by being swung as a result of said third swinging operation.

16. A switch device according to claim 15, wherein one end of said interlock lever is supported by said switch case, an intermediate portion thereof serves as an abutting portion against said knob, and the other end thereof serves as a portion corresponding to said second switch.

17. A switch device according to claim 16, wherein, said second switch is provided with an actuator movable in an axial direction for driving said second movable contact, and the tip end of said actuator serves as an abutting portion abutting against said knob and the intermediate portion thereof serves as an abutting portion for abutting against said interlock lever.

18. A switch device according to claim 17, wherein said one end of said interlock lever is formed into a fork shape and said fork-shaped ends thereof are abutted against two positions holding the axial center of said actuator therebetween by each abutting against respective sides of the axial center thereof.

19. A switch device according to claim 17, wherein, said switches have movable switch plates, each having one end supported by said switch case, another end to which a fixed contact is attached, and an intermediate portion corresponding to said actuator.

20. A switch device according to claim 19, wherein said movable contact plates are arranged so as to lie in opposite directions with the longitudinal axes thereof disposed in parallel, and wherein said fixed contact for said movable contact plate of said first switch is located in the vicinity of a portion supported by said movable contact plate of said second switch.

21. A switch device, comprising;

(a) a switch case;

(b) a knob supported by said switch case and capable of effecting a swinging operation;

(c) an elastic member for holding said knob at a neutral position;

(d) a first actuator attached to said switch case and moved by the swinging of said knob in one direction so as to achieve a first operating state;

(e) a first switch attached to said switch case and having a contact capable of being switched by said first actuator;

(f) a second actuator attached to said switch case and moved by a swinging of said knob in the opposite direction;

(g) a second switch attached to said switch case and having a contact capable of being switched by said second actuator; and (h) an interlock means for operating said second actuator when the swing angle of said knob in said one direction is larger than the swing angle by which said contact of said first switch is switched.

22. A switch device according to claim 21, wherein said interlock means comprises a plate member having opposite ends bent wherein one end thereof rotates about the thereof to operate said second actuator.

23. A switch device according to claim 22, wherein said plate member is connected to intermediate side portions with respect to the direction of the axis of said actuator.

24. A switch device according to claim 23, wherein said plate member has a fork-shaped tip end for uniformly transmitting a driving force through both sides of said actuator abutting to the axial center of said actuator held therebetween.

25. A switch device according to claim 22, wherein said plate member is swung when the intermediate portion thereof is pressed by said knob.

* * * * *